United States Patent [19]

Terui

[11] Patent Number: 4,537,488
[45] Date of Patent: Aug. 27, 1985

[54] CAMERA SYSTEM

[75] Inventor: Nobuhiko Terui, Tokyo, Japan

[73] Assignee: Nippon Kogaku K.K., Tokyo, Japan

[21] Appl. No.: 582,636

[22] Filed: Feb. 22, 1984

[30] Foreign Application Priority Data

Mar. 1, 1983 [JP] Japan .............................. 58-29419[U]

[51] Int. Cl.³ .......................... G03B 3/00; G03B 7/28; G03B 13/02
[52] U.S. Cl. .................................... 354/402; 354/484; 354/219
[58] Field of Search .............................. 354/400–409, 354/268, 484, 219 IF

[56] References Cited

U.S. PATENT DOCUMENTS

| 3,812,499 | 5/1974 | Hayashi et al. ................. 354/219 IF |
| 4,104,650 | 8/1978 | Hosoe et al. ...................... 354/409 X |
| 4,350,418 | 9/1982 | Taguchi et al. .................. 354/468 X |
| 4,460,258 | 7/1984 | Fukuhara et al. .................... 354/402 |

Primary Examiner—William B. Perkey
Attorney, Agent, or Firm—Fitzpatrick, Cella, Harper & Scinto

[57] ABSTRACT

A camera system for a single lens reflex camera of a view-finder interchangeable type of a construction, wherein the interchangeable view-finder provided with a focus detection device and having a battery for the focus detection device built in it is detachably mounted on the camera body provided with an exposure meter and having a battery for the exposure meter built in it, and a battery checking device is provided on each of the view-finder device and the camera body, whereby, when the battery in the camera body is used up, the operations of the exposure meter in the camera body and the focus detection in the view-finder device are stopped.

6 Claims, 3 Drawing Figures

CAMERA SYSTEM

BACKGROUND OF THE INVENTION

This invention relates to a battery checking device to be installed in a camera system composed of a body of a camera or a single lens reflex camera having a battery built therein and an accessory device which can be detachably mounted on the body of the camera or the single lens reflex camera and has the battery built therein.

In a single lens reflex camera of a view-finder interchangeable type, for example, there may be contemplated such a construction that a focus detection device is built into such interchangeable view-finder. In the device of such construction, it may be convenient for a photographer in his use of an ordinary view-finder (such as, for example, an eye-level view-finder), if a battery for exposure control is provided in the camera body and a battery for focus detection is provided in the view-finder.

By the separate installation of the batteries for the view-finder and the camera body, there take place two situations in the battery consumption: the one is when the battery in the camera body is used up earlier than that in the view-finder; and the other is when the battery in the view-finder is used up first.

In the former case, the focus adjusting device for the view-finder is still in an operable condition, even if the battery in the camera body is exhausted. In other words, while it is not possible to optimize the exposure, an in-focus photograph can still be taken. In the latter case, there may be produced a photograph with appropriate exposure, but an out-of-focus photograph results. This makes it necessary on the part of the photographer to constantly know whether both batteries are in their normal conditions, or not.

What has been explained in the foregoing applies not only to the relationship between the body of the single lens reflex camera and the view-finder, but also to a relationship between a camera and a flash light device as well as between a single lens reflex camera and an interchangeable lens having a focus adjusting device.

SUMMARY OF THE INVENTION

It is an object of the present invention to provide a camera system which is capable, when the battery in the camera or the camera body has been exhausted, of stopping operations of an accessory device which is electrically operative with a battery built therein, and is detachably mountable on a camera or a camera body provided with an electrically operable exposure control device and having a battery built therein.

With a view to attaining the abovementioned object, the device according to the present invention is constructed, for example, such that, in a single lens reflex camera of a view-finder interchangeable type, wherein the interchangeable view-finder provided with a focus detection device and having a battery for the focus detection device incorporated therein is made detachably mountable on a camera body provided with an exposure meter and having a battery for the exposure meter incorporated therein, a battery checking device is provided on each of the view-finder and the camera body, whereby, when the battery in the camera body is exhausted, the operations of the exposure meter in the camera body and the focus detection in the view-finder are stopped.

DETAILED DESCRIPTION OF PREFERRED EMBODIMENTS

In the following, the present invention will be described in detail with reference to a couple of preferred embodiments thereof shown in the accompanying drawing.

Figure 1:
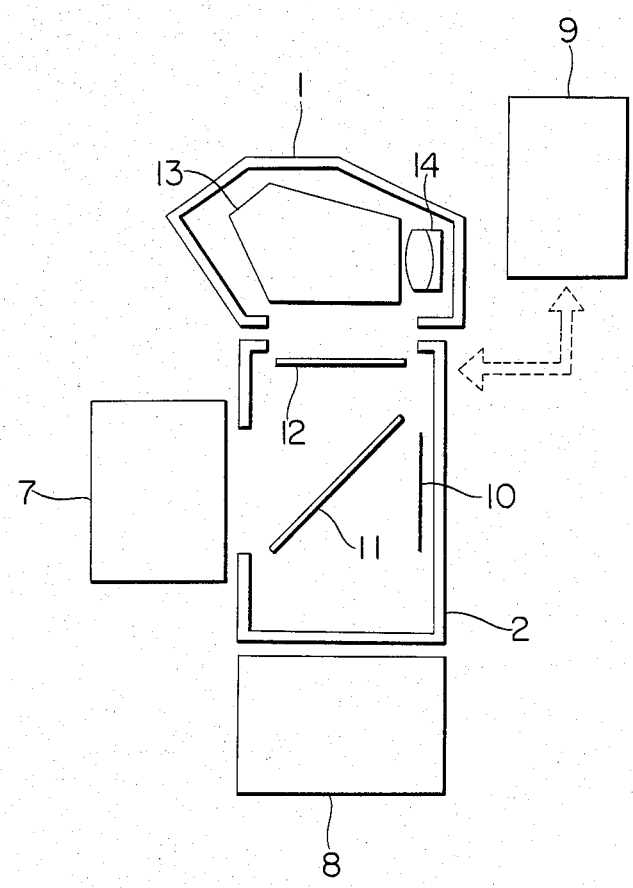
FIG. 1 is a schematic side view, partly in cross-section, showing a construction of one embodiment of the camera system according to the present invention.
Figure 2:
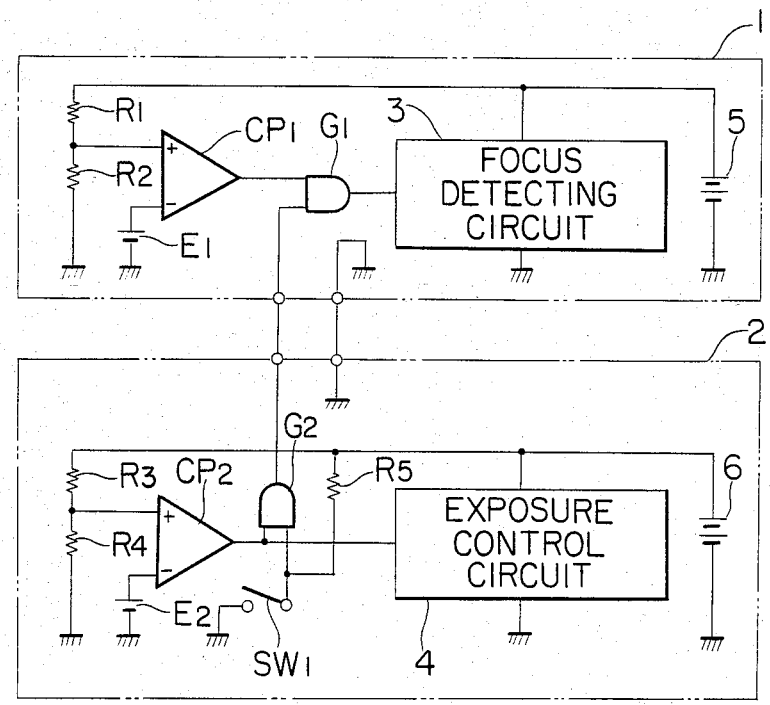
FIGS. 2 and 3 are respectively block diagrams showing the circuit construction of the battery checking device according to the present invention.
Figure 3:
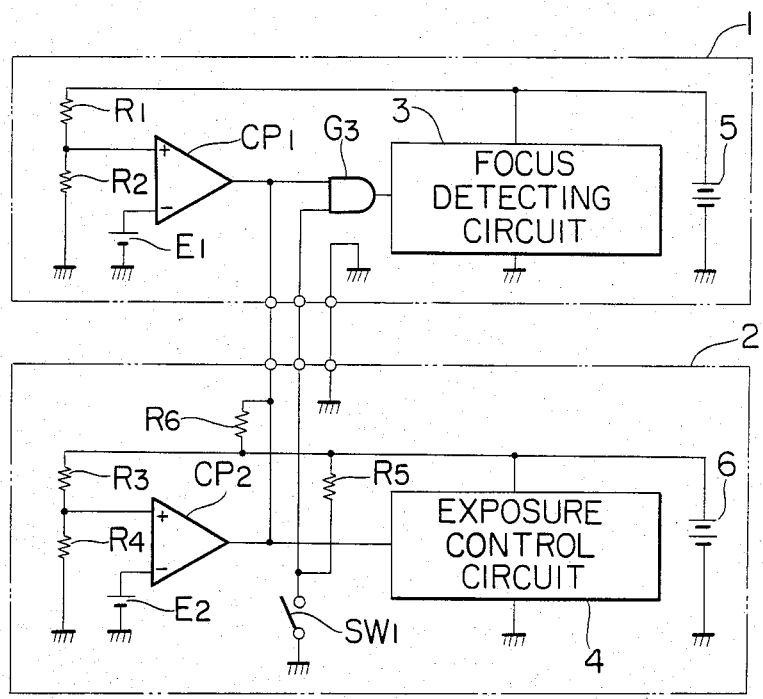

Referring first to FIG. 1 showing a construction of the camera system for a single lens reflex camera as the embodiment of the present invention, the system is constructed with a camera body 2 incorporating therein a photographic film 10, a quick-return mirror 11, a focussing screen 12 which is disposed in an optically equivalent relationship with the exposure surface of the photographic film 10, an exposure control circuit 4 as shown in FIGS. 2 and 3 for controlling exposure on the photographic film 10, and a battery 6 for applying a voltage to the exposure control circuit 4; and accessory devices such as a view-finder 1, a photo-taking lens barrel 7, a motor-drive device 8, and an electronic flash device 9, all being detachably mountable onto the camera body 2.

The view-finder 1 incorporates therein a penta-prism 13, an ocular lens 14 for observing an image on the focussing screen 12, and a focus detection circuit 3 and a battery 5 for applying a voltage to the focus detection circuit 3 as shown in FIGS. 2 and 3. The lens barrel 7 incorporates therein a photographic lens, an automatic focus adjusting circuit, etc. for the photographic lens, and a battery for applying a voltage to the automatic focus adjusting circuit, etc. The motor-drive device 8 incorporates therein a motor drive circuit, etc. (not shown) for winding and re-winding the film 10, and a battery for applying a voltage to the motor drive circuit. The electronic flash device 9 incorporates therein a flash bulb, a booster circuit, etc. and a battery for applying a voltage to the booster circuit.

FIGS. 2 and 3 illustate the circuit construction to be provided in each of the view-finder 1 and the camera body 2.

Referring to FIG. 2 which shows a block diagram of the circuit according to one embodiment of the present invention, the view-finder 1 incorporates therein a focus detection circuit 3 to detect a focussing condition of an image of a photographic object on the exposure surface of the photographic film 10 formed thereon with light which has come in through the photo-taking lens and has been reflected by the mirror 11; resistors $R_1$ and $R_2$; a comparator $CP_1$; a gate $G_1$; a reference power source $E_1$; and a battery 5.

A non-reversible input of the comparator $CP_1$ is connected with the resistors $R_1$ and $R_2$ which divide the voltage from the view-finder battery 5, while a reversible input of the comparator $CP_1$ is connected with the reference voltage source $E_1$. When the battery 5 maintains its normal voltage level, an output from the comparator $CP_1$ assumes a high level; however, when the battery 5 reduces its voltage charge, the voltage at the non-reversible input decreases, and the output from the comparator $CP_1$ assumes a low level. Similarly the comparator $CP_2$ produces a high level output together with the voltage dividing resistors $R_3$ and $R_4$ and the reference voltage source $E_2$ when the battery 6 in the camera body maintains its normal voltage level, but it produces a low level output when the battery decreases its voltage level. When the AND gate $G_1$ receiving an output from the comparator $CP_1$ produces a low level output, the focus detection circuit 3 no longer produces signals to a focus condition display device and a lens drive device (neither being shown).

The camera body 2 incorporates therein the exposure control circuit 4 for controlling the exposure on the photographic film 10; resistors $R_3$, $R_4$ and $R_5$; the comparator $CP_2$; the gate $G_2$; a switch $SW_1$; a reference power source $E_2$; and the battery 6.

One of the input terminals of the AND gate $G_2$ is connected with the output terminal of the comparator $CP_2$, and the other input terminal thereof is connected with a point of connection between the serially connected resistor $R_1$ and the switch $SW_1$. On the other hand, the output terminal of the gate $G_2$ is connected with the other input terminal of the AND gate $G_1$. The switch $SW_1$ is associated with movement of the quick-return mirror 11 and is turned "on" when the mirror is lifted, thereby sending a low level signal to the AND gate $G_2$. When the output from the comparator $CP_2$ assumes a low level, the output from the AND gate $G_2$ also assumes a low level, whereby the exposure control circuit 4 inclusive of a circuit for displaying the exposure information is rendered non-operative and notifies the photographer of exhaustion of the battery charge. As a matter of course, it is to be understood that the lens barrel having therein the photographic lens is attached to the camera body 2.

The circuits shown in FIG. 2 operate in the following three ways: (1) both batteries are maintaining their voltage charge; (2) the battery in the view-finder is used up; and (3) the battery in the camera body is used up. Each of these situations will be explained in the following.

(1) When the batteries in both view-finder and camera body are maintaining their voltage charge:

Since both batteries maintain their voltage level, both comparators $CP_1$ and $CP_2$ produce high level outputs, whereby the AND gates $G_1$ and $G_2$ produce high level outputs when the switch $SW_1$ is "off". Accordingly, the focus detection circuit 3 in the view-finder operates to effect the focus detection of the photo-taking lens and to display the focussing condition. On the other hand, when the shutter is released at the side of the camera body, the quick-return mirror 11 is lifted, whereby the output from the AND gate $G_2$ assumes a low level, and the output from the AND gate $G_1$ also assumes a low level. As the result of this, the circuit 3 in the view-finder is no longer operative. When the film exposure is completed by the exposure control circuit 4, the quick-return mirror 11 drops, whereby the switch $SW_1$ is opened to render the AND gate $G_2$ at a high level. As the consequence, the output from the AND gate $G_1$ also assumes a high level and the focus detection circuit 3 becomes operative again.

(2) When the view-finder battery is exhausted:

Since the output from the comparator $CP_1$ is always at the low level, the output from the AND gate $G_1$ is always rendered low level, whereby the focus detection circuit 3 is made inoperative to hinder the focus displaying and the automatic focussing operations. On the other hand, since the output from the comparator $CP_2$ is at the high level, the exposure control circuit 4 remains operative. Accordingly, the photographer is still able to carry out the photographic operations by using the camera as one having no automatic focus detection device.

(3) When the camera body battery is exhausted:

Since the output from the comparator $CP_2$ is always at the low level, both focus detection circuit 3 and the exposure control circuit 4 are in their non-operative conditions.

FIG. 3 is a block diagram showing another embodiment of the circuit according to the present invention. The point of difference in this circuit construction from that of FIG. 2 is that the outputs of both comparators $CP_1$ and $CP_2$ are changed to an open collector, each output being connected by a wired OR so as to be connected with one of the input terminals of the AND gate $G_3$ and the exposure control circuit 4.

In this embodiment, too, the circuits operate in the following three ways: (1) both batteries are maintaining their voltage charge; (2) the view-finder battery is exhausted; and (3) the camera body battery is exhausted. Each of these situations will be explained in the following.

(1) When the batteries in both view-finder and camera body are maintaining their voltage charge:

As is the case with the FIG. 2 embodiment, when the automatic focus detection operation is performed in the view-finder and the shutter is released in the camera body, the quick-return mirror is lifted, in association with which the switch $SW_1$ is closed and the output from the AND gate $G_3$ assumes the low level, whereby the focus detection circuit 3 is brought to a non-operative condition. As soon as the mirror returns to its original position upon completion of the exposure, the switch $SW_1$ opens and the automatic focus detection circuit 3 begins also its operation.

(2) When either battery is exhausted:

If the view-finder battery is exhausted, the output from the comparator $CP_1$ assumes a low level; and if the camera body battery is exhausted, the comparator $CP_2$ assumes a low level. On account of this, the automatic focus detection circuit 3 and the exposure control circuit 4 are both brought to their inoperative conditions.

In the foregoing, the present invention has been described with reference to preferred embodiments thereof. It should however be noted that the invention is not limited to these embodiments alone, but any changes and modifications may be made by those persons skilled in the art within the spirit and scope of the invention as recited in the appended claims.

I claim:

1. A camera system for exposing a photographic film to an image of a photographic object, which comprises in combination:
(a) an optical device for focusing the image of the photographic object on a predetermined plane;
(b) a camera body, in which said photographic film is disposed in a predetermined plane, said camera body being detachably mounted on said optical device, and including a first power source, exposure control means for controlling exposure on said film by application of a voltage from said first power source, and a voltage detection means for detecting a voltage to be applied to said exposure control means from said first power source, said voltage detection means producing a detection signal when the voltage as detected is lower than a predetermined voltage level; and (c) a view-finder device for observing the image of the photographic object on said predetermined plane, said device being detachably mounted on said camera body, and including a second power source, focus detection means operable for detecting a focused state of the image of the photographic object on said predetermined plane by application of a voltage from said second power source, and means for introducing said detection signal from said camera body, said focus detection means stopping its operation in response to said detection signal.

2. The camera system according to claim 1, wherein said camera body includes a first housing means for housing therein said first power source, said exposure control means, and said voltage detection means; and said view-finder device includes a second housing means for housing therein said second power source and said focus detection means, and means for connecting said first and second housing means, said connecting means comprising means for electrically connecting said camera body and said finder device.

3. A camera system for exposing a photographic film to an image of a photographic object, which comprises in combination:

(a) an optical device for focusing the image of the photographic object on a predetermined plane;

(b) a camera body, in which said photographic film is disposed in a predetermined plane, said camera body being detachably mounted on said optical device, and including a first power source, exposure control means for controlling exposure on said film by application of a voltage from said first power source, and a first voltage detection means for detecting a voltage to be applied to said exposure control means from said first power source, said first voltage detection means producing a detection signal when the voltage as detected is lower than a predetermined voltage level; and (c) a view-finder device for observing the image of the photographic object on said predetermined plane, said device being detachably mounted on said camera body, and including a second power source, focus detection means operable for detecting a focused state of the image of the photographic object on said predetermined plane by application of a voltage from said second power source, means for introducing said detection signal from said camera body, and a second voltage detection means for detecting a voltage to be applied to said focus detection means from said second power source, said second voltage detection means producing a second detection signal when the voltage as detected is lower than the second predetermined voltage level, and said focus detection means stopping its operation in response to said first and second detection signals.

4. The camera system according to claim 3, wherein said camera body includes means for introducing said second detection signal from said device, and means for stopping said exposure control means in response to said first and second detection signals.

5. The camera system according to claim 4, wherein said camera body includes a first housing means for housing therein said first power source, said exposure control means, said stopping means, and said first voltage detection means; and said view-finder device includes a second housing means for housing therein said second power source, said focus detection means, and said second voltage detection means, and means for connecting said first and second housing means, said connecting means including means for electrically connecting said camera body and said view-finder device.

6. A camera system for exposing a photographic film to a photographic image, which comprises in combination:

(a) a camera body, in which said photographic film is disposed, said camera body including a first power source, exposure means capable of controlling exposure of said film by application of a voltage from said first power source, and detection means for detecting the voltage applied to said exposure means and producing a detection signal when the voltage applied to said exposure means is lower than a predetermined voltage level; and (b) an accessory device for said camera body, said device being detachably mountable on said camera body, and including a second power source, driving means capable of being driven upon application of a voltage from said second power source, and means for introducing said detection signal from said camera body, said driving means stopping its operation in response to said detection signal.

* * * * *